United States Patent
Lu et al.

(10) Patent No.: US 10,484,117 B1
(45) Date of Patent: Nov. 19, 2019

(54) POLARIZATION FILTER SYSTEMS AND METHODS

(71) Applicant: Lattice Semiconductor Corporation, Portland, OR (US)

(72) Inventors: Rongrong Lu, San Jose, CA (US); Ron Zeng, San Jose, CA (US)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 0 days.

(21) Appl. No.: 16/103,720

(22) Filed: Aug. 14, 2018

Related U.S. Application Data

(60) Provisional application No. 62/687,787, filed on Jun. 20, 2018.

(51) Int. Cl.
| | |
|---|---|
| H04J 1/12 | (2006.01) |
| H01Q 1/52 | (2006.01) |
| H04B 1/40 | (2015.01) |
| H01Q 1/38 | (2006.01) |
| H04L 5/14 | (2006.01) |

(52) U.S. Cl.
CPC .............. *H04J 1/12* (2013.01); *H01Q 1/38* (2013.01); *H01Q 1/528* (2013.01); *H04B 1/40* (2013.01); *H04L 5/14* (2013.01)

(58) Field of Classification Search
CPC .. H04J 1/12; H01Q 1/38; H01Q 1/528; H04B 1/40; H04L 5/14
See application file for complete search history.

(56) References Cited

U.S. PATENT DOCUMENTS

2013/0300602 A1* 11/2013 Zhou ................ H01Q 3/247
342/372

* cited by examiner

*Primary Examiner* — Duc C Ho
(74) *Attorney, Agent, or Firm* — Haynes and Boone, LLP

(57) ABSTRACT

Systems and methods for dual channel polarization filter structures are disclosed. An example wireless communication system includes a first transceiver module of a wireless communication system configured to form one or more linearly polarized communication links with a second transceiver module of the wireless communication system, and a dual channel polarization filter structure positioned between the first and second transceiver modules and configured to filter the one or more linearly polarized communication links to produce corresponding one or more filtered linearly polarized communication links. The dual channel polarization filter structure includes first and second filter channels each formed from three structural layers including at least one metalized layer printed circuit board (PCB) disposed between the remaining two structural layers, and each filter channel includes an array of filter elements each comprising at least one metamaterial absorber arrangement.

20 Claims, 11 Drawing Sheets

POLARIZATION FILTER SYSTEMS AND METHODS

CROSS REFERENCE TO RELATED APPLICATIONS

This application claims priority to U.S. Provisional Patent Application No. 62/687,787 filed Jun. 20, 2018, which is incorporated herein by reference in its entirety.

TECHNICAL FIELD

The present disclosure relates generally to wireless communication devices, and in particular, to high bandwidth systems and/or architectures with enhanced reliability.

BACKGROUND

There is continuing interest in miniaturizing wireless communication devices, including their antenna systems. Therefore, such antennas and antenna systems are typically closely packed. The small distance between the antennas has the potential to increase mutual coupling between them, hence increasing the risk of interference and performance degradation.

Prior art solutions do not provide satisfactory decoupling or are difficult to implement. For example, perfectly isolated transmitter/receiver channels (equivalent to wave guides) are not practical, tend to defeat the link flexibility benefit from wireless connections, and work against the miniaturization of the wireless communication devices. Active circuit cross-talk cancellation is possible, but the power consumption is typically too high with the required digital signal processing to combat complex reflections. Also, the undesirable mutual coupling is occurs in the link range space between the transmitter and receiver and cannot be fully addressed using conventional antenna package designs.

Thus, there is a need in the art for a compact and inexpensive-to-implement wireless communication architecture that can operate reliably at high bandwidths and with minimal performance degrading mutual coupling, as described herein.

Figure 1:
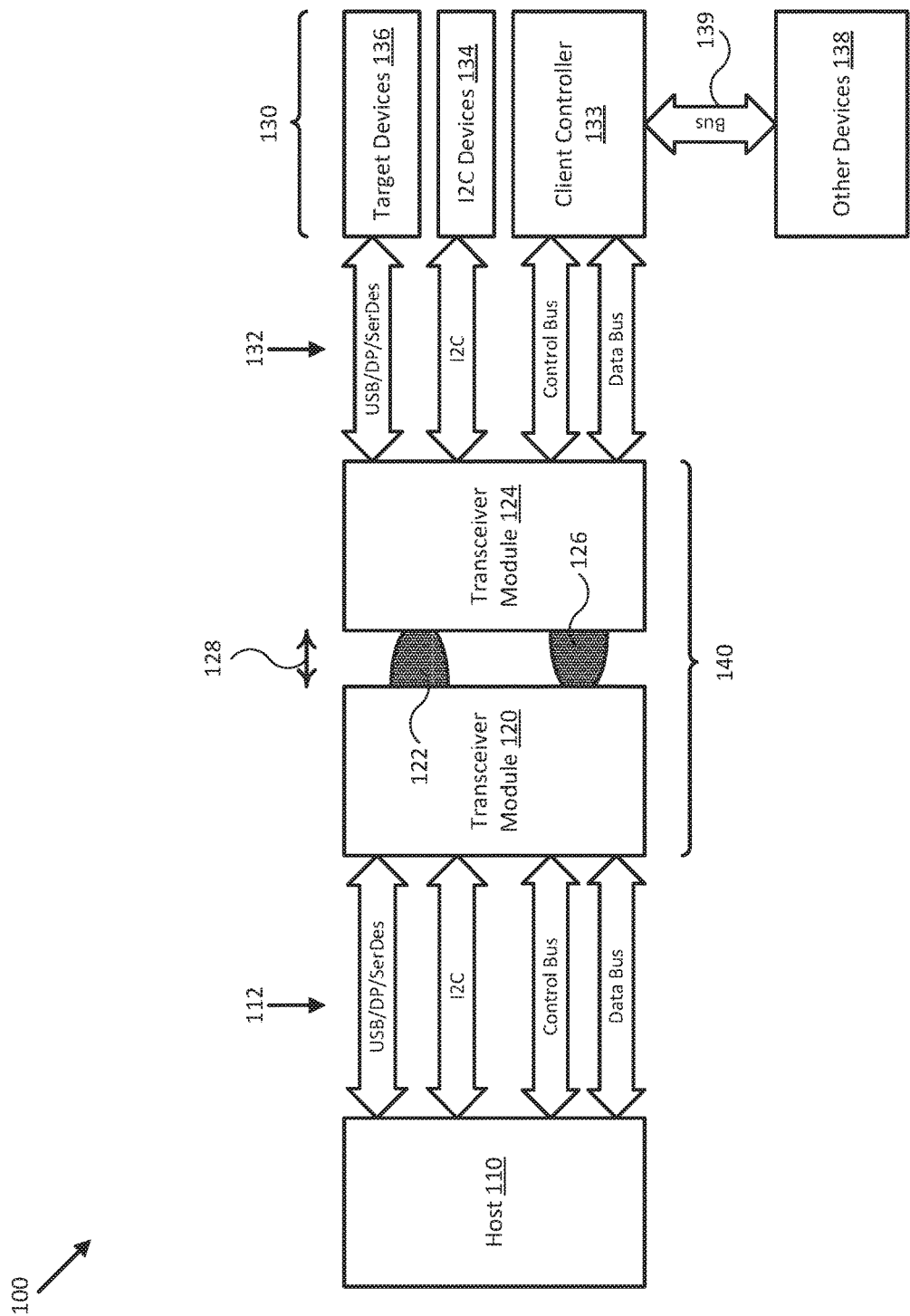
FIG. 1 is a block diagram illustrating wireless communication system, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for enhanced communication performance in wireless communication systems. For example, embodiments provide systems and methods of improving performance of a wireless communication system expected to experience performance-degrading crosstalk signals generated by reflections off proximate structures by including a multichannel polarization filter disposed between transceivers of the wireless communication system. The multichannel polarization filter filters incident linear polarized wireless communication links according to multiple selected principal polarization directions without generating reflected signals by absorbing off-polarized signals, as described herein.

In various embodiments, such polarization filter may be implemented by multiple filter channels each including an array of individual filter elements formed from three patterned structural layers: a top structural layer including a patterned resistive film on a substrate, a middle structural layer implemented by a printed circuit board (PCB) with two patterned metalized layers, and a bottom structural layer that is a mirror image of the top structural layer. Advantageously, embodiments may be formed from relatively low cost PCB dielectric material (e.g., FR-4, FR-5, FR-6, polymide, G-10, G-11, and/or other relatively low cost PCB material) using common (and also relatively inexpensive) PCB patterning techniques and tolerances.

FIG. 1 is a block diagram illustrating wireless communication system 100 in accordance with an embodiment of the present disclosure. As shown in FIG. 1A, system 100 may include a host 110 with a host transceiver module 120 separated by and communicating wirelessly over a gap distance 128 with client devices 130 each coupled to a client transceiver module 124, where transceiver modules 120 and 124 are configured to form one or more linearly polarized wireless communication links 122, 126 and form wireless communication linkage 140. In various embodiments, wireless communication linkage 140 may be a stationary or rotary wireless communication linkage, for example, and may include one or multiple individual half or full duplex linearly polarized wireless communication links 122, 126. In particular embodiments, linearly polarized wireless communication link 122 is polarized orthogonally to linearly polarized wireless communication link 126 in order to provide signal isolation between the two links, and each link 122, 126 may be formed with an axial ratio (e.g., ratio of signal strength at principal polarization angle to signal strength at corresponding orthogonal polarization angle) greater than 20 dB. Under such conditions, each of linearly polarized wireless communication links 122, 126 may be configured to operate within the same 60 GHz mmWave frequency band (e.g., 57-64 GHz) and to support up to 6 Gbps data bandwidths each (e.g., for 12 Gbps aggregate bandwidth in embodiments with two full duplex communication links).

In general, host 110 communicates universal serial bus (USB) data, inter-integrated circuit (I2C) data, and/or other control or data signals over host buses 112 to host transceiver module 120, and host transceiver module 120 is configured to establish linearly polarized wireless communication link 122 with client transceiver module 124 and communicate control and/or data signals from host buses 112 to client transceiver module 124. Client transceiver module 124 communicates received control and/or data signals over client buses 132 to one or more client devices 130, such as target devices 136, I2C devices/peripherals 134, client controller 133, and/or to other devices 138 via client controller 133 and bus 139, as shown. Such process may be reversed to communicate control and/or data signals from client devices 130 to host 110. Host and/or client buses 112 and 132 may include one or more USB 2.0/3.0 buses, display port buses, serializer/deserializer (SerDes) buses, I2C buses, and/or other or additional control and/or data buses, for example, and all data from all buses may be conveyed between transceiver modules 120 and 124 wirelessly, up to the maximum bandwidth supported by the one or more established wireless communication links of wireless communication linkage 140.

As shown in the embodiment illustrated in FIG. 1, system 100 includes host 110 and client controller 133. Host 110 and/or client controller 133 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of client controller 133, client devices 130, transceiver modules 120 and 124, and/or other elements of system 100, for example. Such software instructions may also implement methods for processing sensor signals, determining sensor information, providing user feedback (e.g., through a display), querying devices for operational parameters, selecting operational parameters and/or modes for devices, or performing any of the various methods described herein.

In various embodiments, host 110 and/or client controller 133 may each be implemented with a machine readable medium for storing non-transitory instructions for loading into and execution by host 110 or client controller 133. In these and other embodiments, host 110 and/or client controller 133 may be implemented with other components where appropriate, such as volatile memory, non-volatile memory, one or more interfaces, and/or various analog and/or digital components for interfacing with various modules of system 100. For example, host 110 may be adapted to store sensor signals, sensor information, parameters for coordinate frame transformations, calibration parameters, sets of calibration points, and/or other operational parameters, over time, for example, and provide such stored data to a display (e.g., an optional element of host 110).

In typical embodiments, host 110 may be tasked with overseeing general operation of system 100, generating imagery from sensor data, correlating sensor data/imagery, communicating operational parameters and/or sensor information with other devices through wireless communication linkage 140, and/or other operations of system 100. In such embodiments, client controller 133 may be implemented with relatively high resolution timing circuitry capable of generating digital transmission and/or sampling control signals for operating a LIDAR or other sensor system (e.g., other devices 138) and/or other devices of system 100, for example, and other time critical operations of system 100, as described herein.

Transceiver modules 120 and 124 may each be implemented with one or more digital to analog converters (DACs), signal shaping circuits, filters, phase adjusters, signal conditioning elements, amplifiers, attenuators, timing circuitry, logic devices, and/or other digital and/or analog electronics configured to accept digital control signals from host 110 and/or client controller 133 and to provide analog transmission signals to form one or more wireless communication links, as described herein. In various embodiments, overall operation of transceiver modules 120 and 124 (e.g., amplification, attenuation, phase shifting, and/or other signal adjustments) may be controlled (e.g., through use of the various control signals) by host 110 and/or client controller 133.

Other devices 138 may include one or more additional interfaces, feedback devices, support electronics, and/or environmental sensors, such as a physical user interface device (e.g., a joystick, rotating selector, button, display), indicator, battery or power supply/charging circuit, strap or lanyard, wired or wireless communications interface, external memory slot or interface, speaker, microphone, fingerprint sensor, pulse monitor, digital light/image projector, accelerometer/gyroscope, global navigation satellite system (GNSS) receiver, LIDAR system and/or other ranging sensor system, and/or other electronic modules or devices.

In various embodiments, client devices 130 may be configured to control and/or implement a sensor system, such as a LIDAR system or other ranging sensor system, and sensor data corresponding to a detected object (e.g., range and/or direction to such detected object) may be communicated to host 110 using wireless communication linkage 140, as shown. Such arrangement can be particularly helpful when one or more of client devices 130 includes an articulated sensor element, such as a rotating LIDAR sensor element, for example, where a wired communication link between host 110 any client devices 130 may be relatively difficult or expensive to implement. As shown in FIG. 1, other devices 138 may include one or more articulated sensor elements, for example.

Figure 2:
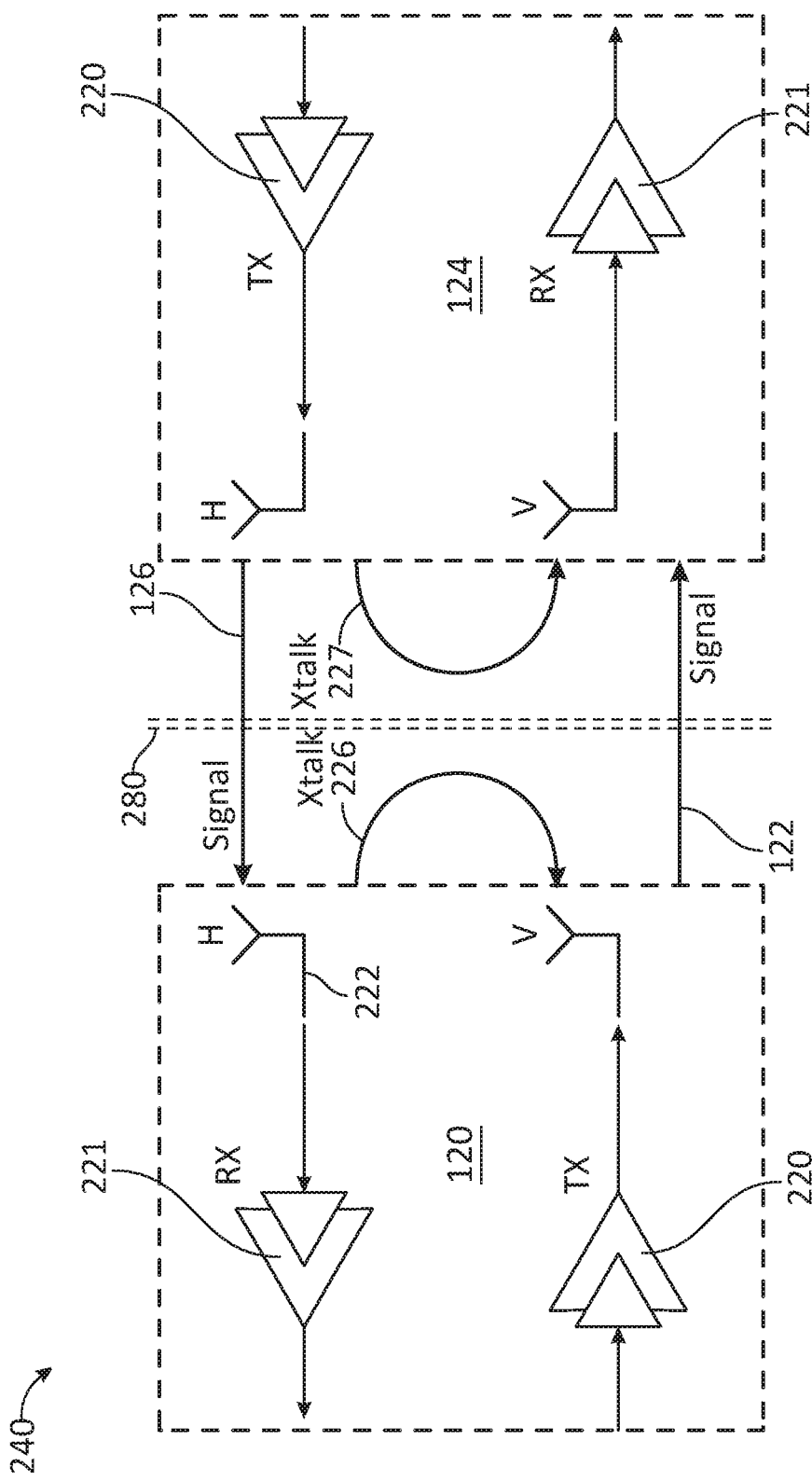
FIG. 2 is a block diagram illustrating a wireless communication linkage of a wireless communication system, in accordance with an embodiment of the present disclosure.

FIG. 2 is a block diagram illustrating a wireless communication linkage 240 of wireless communication system 100, in accordance with an embodiment of the present disclosure. In various embodiments, transceiver modules 120 and 124 may be configured to support various control and/or data protocols and bandwidth requirements, including USB 2.0/USB 3.0 compatible data and I2C-compatible control and status information transfers, using two or more high speed, full duplex wireless links (e.g., typically up to 6 Gbps for each link). The two wireless links typically operate in the same 60 GHz mmWave frequency band and are isolated only by orthogonal linear polarization, shown in FIG. 2 as linearly polarized wireless communication link 122 and orthogonal linearly polarized wireless communication link 126. Link quality for such links is largely determined by forward signal strength (e.g., primarily a function of distance and material loss) and crosstalk signal strength (e.g., primarily a function of reflected and direct signal insertion), where it is desirable to maximize the forward signal strength and minimize the crosstalk signal strength. Crosstalk signal strength can vary wildly between different enclosure designs, gap distances, and system arrangements, and custom mitigations can require relatively expensive and time consuming trial and error and/or design processes.

As shown in FIG. 2, wireless communication linkage 240' includes host transceiver module 120 and client transceiver module 124, each including their own transmitter and receiver circuitry 220 and 221 and horizontally or vertically polarized antenna systems 222 used to generate linearly polarized wireless communication links 122 and 126 across enclosure boundary 280 (e.g., associated with enclosures for host 110 and client devices 130). As is also shown in FIG. 2, wireless communication linkage 240 suffers from crosstalk 226 between the signals generated by transceiver module 120 and the signals received by transceiver module 120, and from crosstalk 227 between the signals generated by transceiver module 124 and the signals received by transceiver module 124, as shown.

Figure 3:
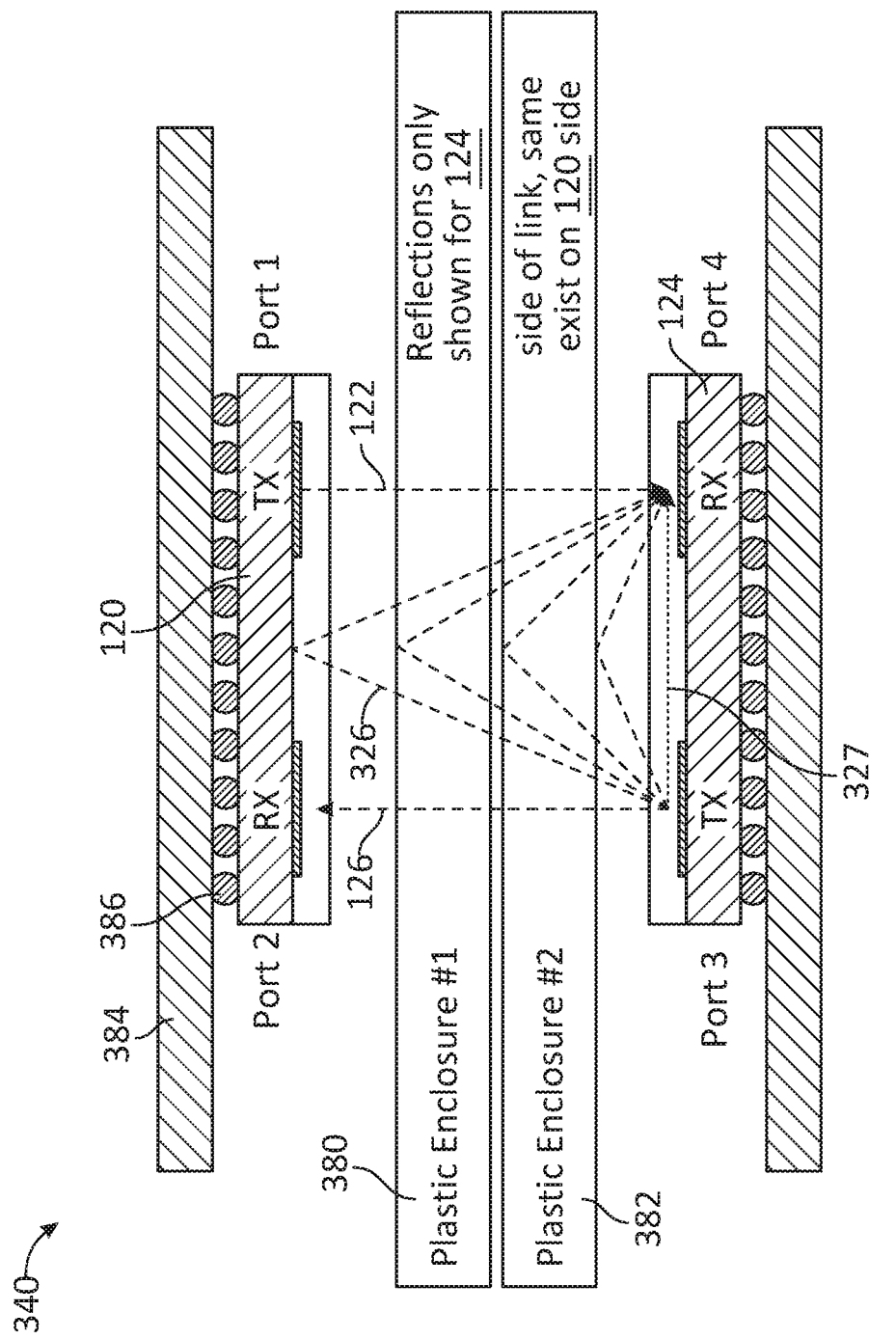
FIG. 3 is a block diagram illustrating a wireless communication linkage of a wireless communication system, in accordance with an embodiment of the present disclosure.

FIG. 3 is a block diagram illustrating a wireless communication linkage 340 of wireless communication system 100, in accordance with an embodiment of the present disclosure. As shown in FIG. 3, wireless communication linkage 240 includes host transceiver module 120 and client transceiver module 124, each generating linearly polarized wireless communication links 122 and 126 across enclosure shells 380 and 382 (e.g., associated with enclosures for host 110 and client devices 130). Each transceiver module 120, 124 may be coupled to a bus interface 384 (e.g., associated with host bus 112 or client bus 132) via electrical coupling 386 (e.g., a surface mount electrical coupling, such as solder bumps, paste, and/or compression couplings).

Also shown in FIG. 3 are reflected crosstalk signals 326 generated by linearly polarized wireless communication link 126 reflecting off of various surfaces associated with wireless communication linkage 340, such as inner and outer surfaces of enclosure shells 380 and 382 and/or transceiver module 120, and direct crosstalk signals 327 also generated by linearly polarized wireless communication link 126, each of which interfere with linearly polarized communication link 122 as received by transceiver module 124. For example, although linearly polarized wireless communication link 126 is generated with a primary polarization direction that is orthogonal to that of linearly polarized communication link 122 (and the corresponding transceiver channel of transceiver module 124), the axial ration of linearly polarized wireless communication link 126 is roughly 20 dB, and so linearly polarized wireless communication link 126 still contains some signals that will interfere with linearly polarized wireless communication link 122 and couple to the orthogonal transceiver channel of transceiver module 124, as shown. Similar issues exist for transceiver module 122 with respect to linearly polarized wireless communication link 122. Embodiments address these issues by filtering each channel of wireless communication linkage 340 (e.g., each of linearly polarized wireless communication links 122, 126) using an inexpensive and compact passive filter structure to reduce or eliminate reflected crosstalk signals 326 and direct crosstalk signals 327.

Figure 4:
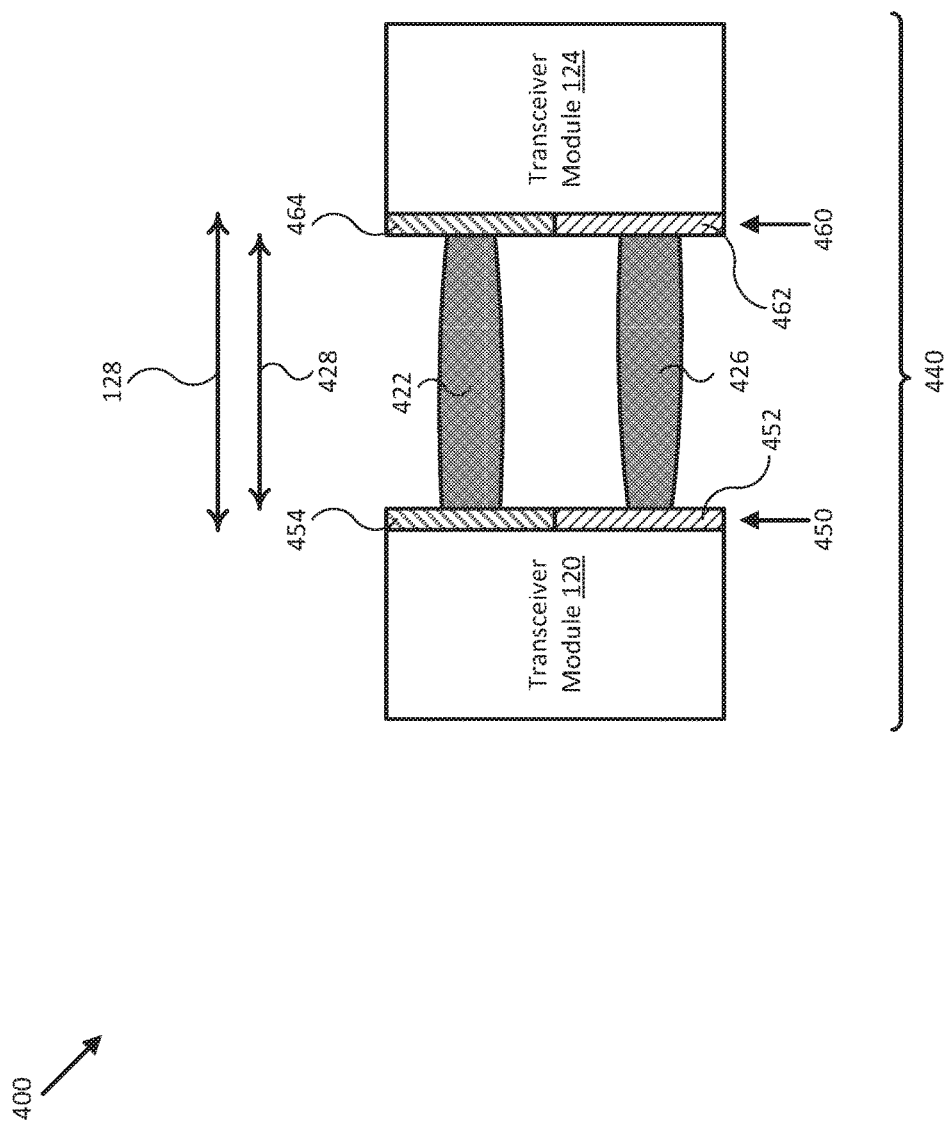
FIG. 4 is a block diagram illustrating a wireless communication system incorporating a dual channel polarization filter structure, in accordance with an embodiment of the present disclosure.

FIG. 4 is a block diagram illustrating wireless communication system 400 incorporating one or more dual channel polarization filter structures 450 and 460, in accordance with an embodiment of the present disclosure. In the embodiment shown in FIG. 4, wireless communication system 400 (e.g., an embodiment of wireless communication system 100) includes filtered communication linkage 440 generated by host transceiver module 120, client transceiver module 124, and dual channel polarization filter structures 450 and 460. Each dual channel polarization filter structure 450 and 460 includes first and second filter channels 452 and 454, or 462 and 464, where the pair of filter channels are configured to pass two orthogonal principal components of corresponding linearly polarized wireless communication links 122 and 126 and to absorb crosstalk reflection and direct interference, as described herein. For example, filter channels 452 and 462 may be configured to generate and/or pass horizontally polarized wireless communication link 426 (e.g., generated from horizontal linearly polarized wireless communication link 126 interacting with filter channel 462, and passed to transceiver module 120 by filter channel 452) across inner portion 428 of gap distance 128 and absorb crosstalk reflection and direct interference (e.g., signals 326 and 327 in FIG. 3) generated by orthogonal/vertical linearly polarized wireless communication link 122 and/or corresponding vertically polarized wireless communication link 422 and interactions of such signals with surfaces associated with wireless communication linkage 440. Dual channel polarization filter structures 450 and 460 may work similarly in embodiments where linearly polarized wireless communication links 122 and 124 are full duplex wireless links (e.g., bidirectional wireless links).

In various embodiments, dual channel polarization filter structure 440 may be implemented according to a metamaterial based absorptive filter formed by sandwiching three appropriately patterned structural layers together: a top layer including a substrate supporting a patterned resistive film (e.g., sometimes referred to as OhmegaPly®, which may include various Nickel Phosphorous (NiP) alloys and may be used to form a relatively thin film of relatively resistive NiP metal alloy material on a dielectric substrate, which may in turn be patterned to form various structures, as described herein), middle layer including a patterned two layer PCB (patterned metallized layer, dielectric layer, patterned metalized layer), and a bottom layer that is a mirror image of the top layer and formed using the same materials. The thickness of the substrates of the top and bottom layers may be selected to be roughly one quarter the wavelength of the center frequency of the operational band (e.g., ~60 GHz). Each layer may be patterned to pass a particular polarization direction for a corresponding filter channel and to absorb all other polarization directions with respect to that filter channel, as described herein. In various embodiments, dual channel polarization filter structure 450 may be coupled or affixed to, or otherwise held stationary relative to transceiver module 120, and dual channel polarization filter structure 460 may be coupled or affixed to, or otherwise held stationary relative to transceiver module 124. In some embodiments, dual channel polarization filter structures 450 and 460 may be spaced from transceiver modules 122 and 124 within gap distance 128.

Figure 5:
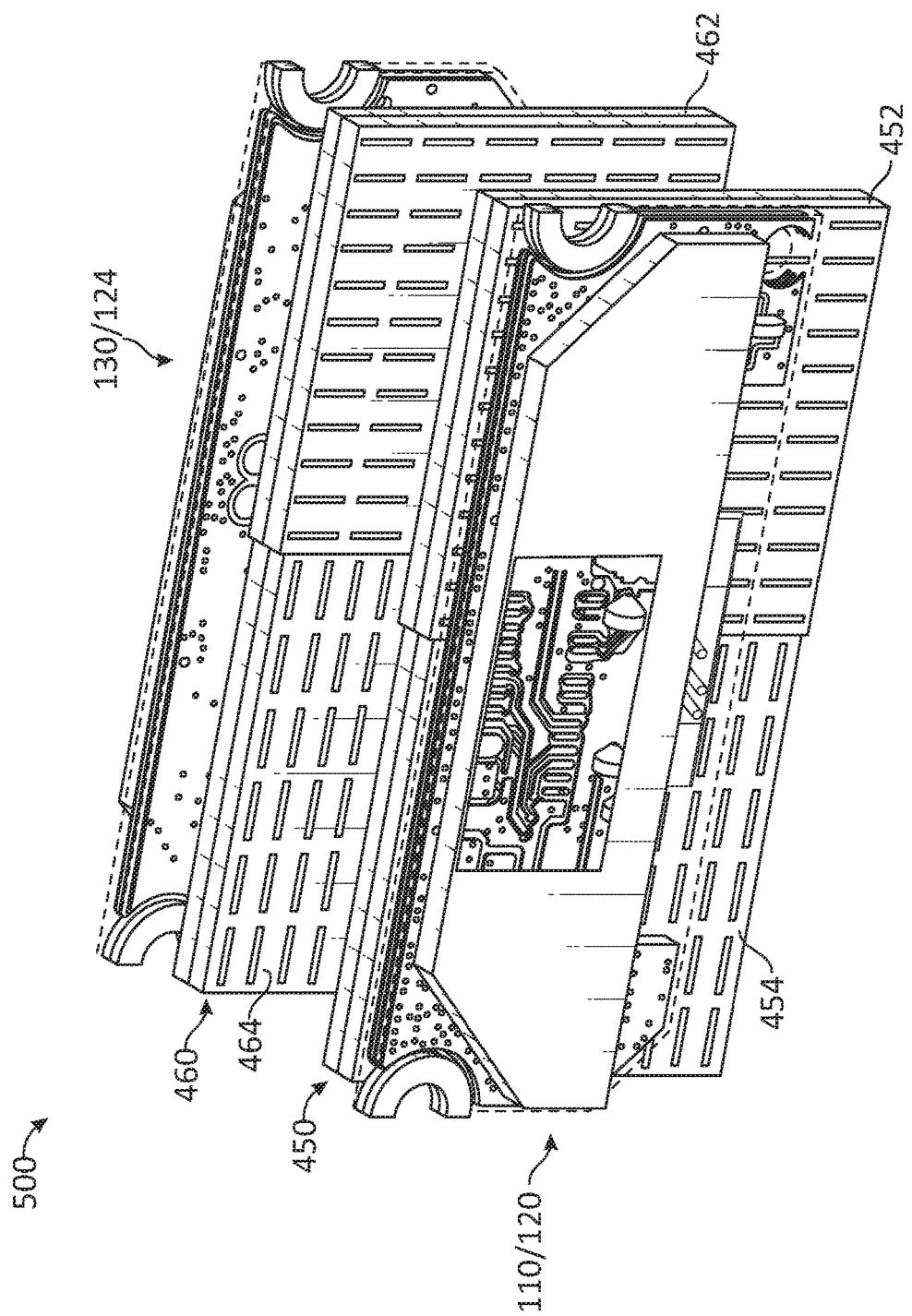
FIG. 5 is a schematic diagram illustrating a wireless communication system incorporating a dual channel polarization filter structure, in accordance with an embodiment of the present disclosure.

FIG. 5 is a schematic diagram illustrating wireless communication system 500 incorporating dual channel polarization filter structures 450 and 460, in accordance with an embodiment of the present disclosure. In the embodiment shown in FIG. 5, wireless communication system 500 includes host/host transceiver module 110/120 coupled to dual channel polarization filter structure 450 (e.g., to first/vertical filter channel 452 and second/horizontal/orthogonal filter channel 454 of dual channel polarization filter structure 450) and client devices/client transceiver module 130/124 coupled to dual channel polarization filter structure 460 (e.g., to first/vertical filter channel 462 and second/horizontal/orthogonal filter channel 464 of dual channel polarization filter structure 460).

Figure 6:
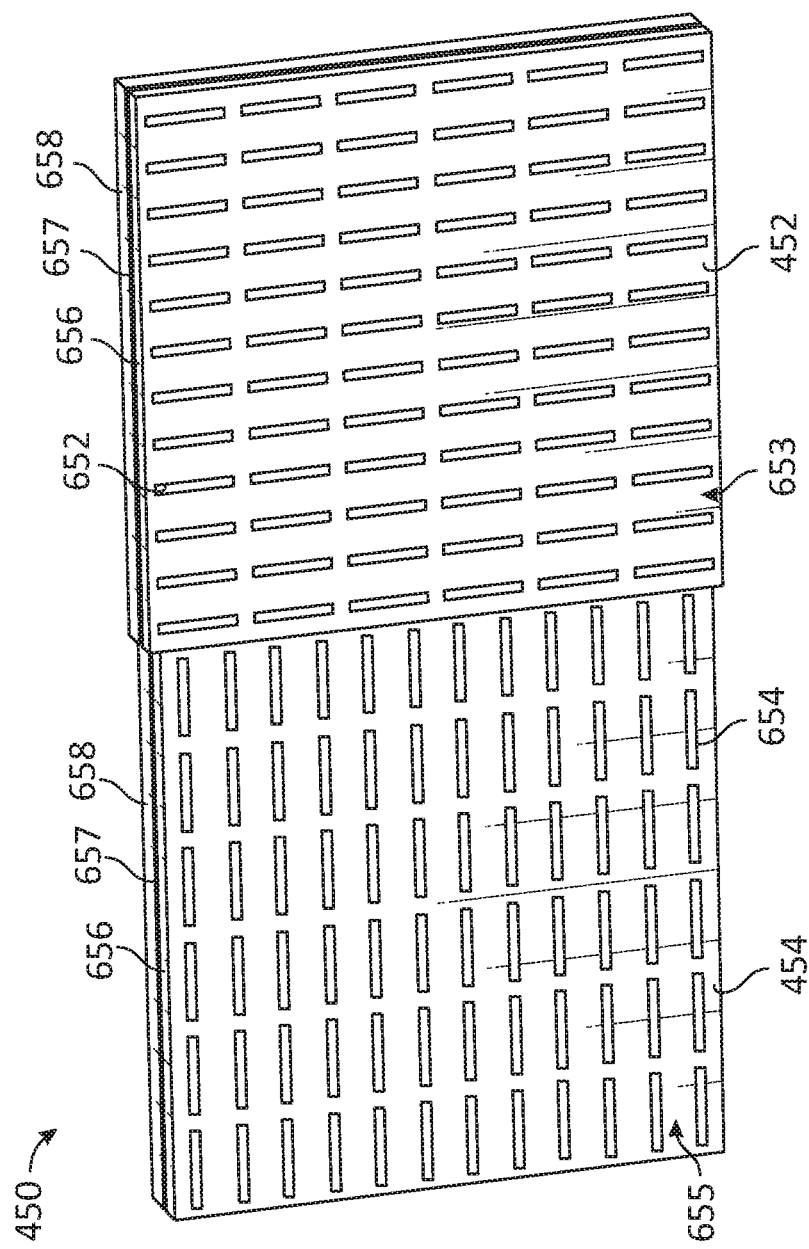
FIG. 6 is a schematic diagram illustrating a dual channel polarization filter structure for a wireless communication system, in accordance with an embodiment of the present disclosure.

FIG. 6 is a schematic diagram illustrating dual channel polarization filter structure 450 for wireless communication systems 100, 400, and/or 500, in accordance with an embodiment of the present disclosure. In the embodiment shown in FIG. 6, dual channel polarization filter structure 640 includes first filter channel 452 and second orthogonal filter channel 454. Each channel is formed from three structural layers: a top patterned resistive layer 656, and middle patterned metal PCB layer 657, and a bottom patterned resistive layer 658. As shown in FIG. 6, first filter channel 452 includes an array of rectangular filter elements 652 aligned vertically and dimensioned to operate efficiently within the operational band of wireless communication linkages 140, 240, 340, and/or 440. Second filter channel 454 includes an array of rectangular filter elements 654 aligned horizontally (e.g., orthogonally to rectangular filter structures 652) and similar dimensioned to operate efficiently within the operational band of wireless communication linkages 140, 240, 340, and/or 440. Filter channels 452 and 454 may each include respective mating surfaces 653 and 655 configured to adhere to transceiver modules 120 and/or 124, for example, or other structures of wireless communication linkages 140, 240, 340, and/or 440. Each filter element 652 and/or 654 generally includes spatially associated or adjoining rectangular patterned structures in all three structural layers 656, 657, 658 (e.g., in a direction normal to mating surfaces 653 and/or 655), as described herein.

More generally, dual channel polarization filter structure 450 may be configured to filter 57 GHz to 64 GHz linearly polarized mmWave wireless links or signals to create orthogonally polarized mmWave wireless links or signals with axial ratios greater than 20 dB. For dual channel polarization filter structure 450, the insertion loss may be less than 1 dB and the reflection less than −10 dB.

Figure 7:
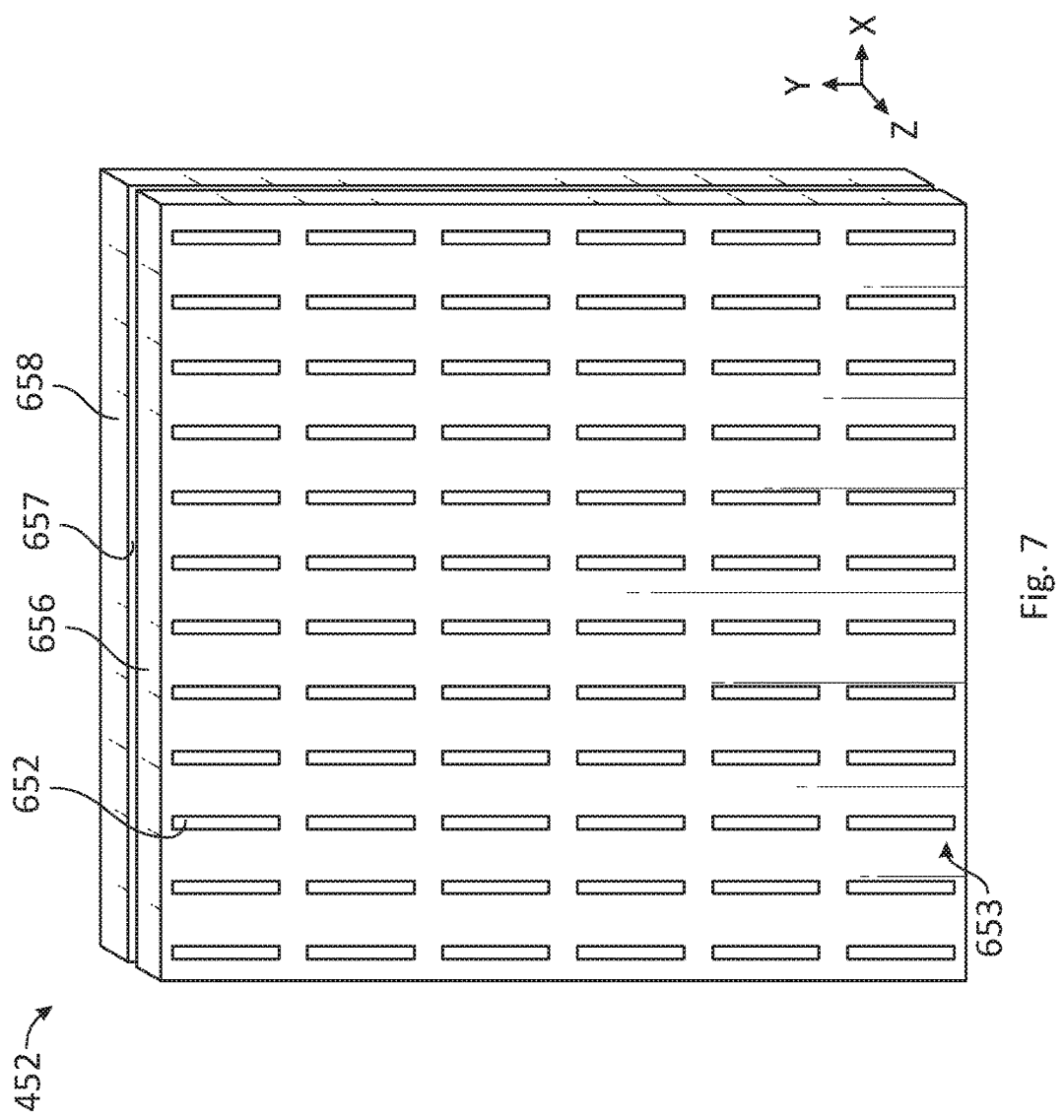
FIG. 7 is a schematic diagram illustrating a single channel of a dual channel polarization filter structure for a wireless communication system, in accordance with an embodiment of the present disclosure.

FIG. 7 is a schematic diagram illustrating a single channel 452 of dual channel polarization filter structure 450 for wireless communication systems 100, 400, and/or 500, in accordance with an embodiment of the present disclosure. In the embodiment shown in FIG. 7, filter channel 452 includes top patterned resistive layer 656, middle patterned metal PCB layer 657, and bottom patterned resistive layer 658. As shown in FIG. 7, filter channel 452 includes an array of rectangular filter elements 652 aligned vertically and dimensioned to operate efficiently within the operational band of wireless communication linkages 140, 240, 340, and/or 440. Filter channel 452 may include mating surface 653 configured to adhere to transceiver modules 120 and/or 124, for example, or other structures of wireless communication linkages 140, 240, 340, and/or 440. Each filter element 652 generally includes spatially associated or adjoining rectangular patterned structures in all three structural layers 656, 657, 658 (e.g., in a direction normal to mating surfaces 653 and/or 655), as described herein.

Figure 8A:
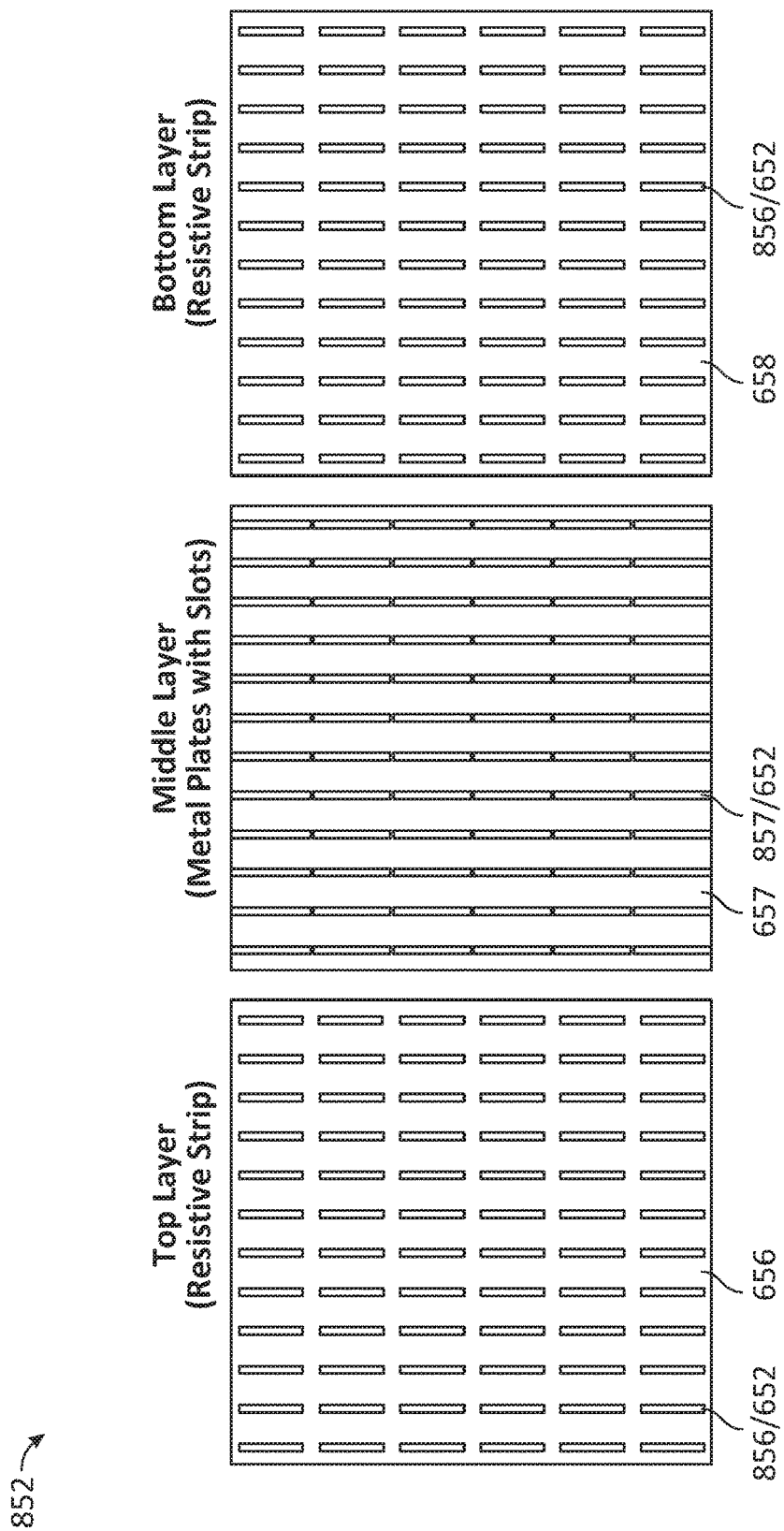
FIG. 8A is a schematic diagram illustrating individual structural layers of a single filter channel of a dual channel polarization filter structure for a wireless communication system, in accordance with an embodiment of the present disclosure.

FIG. 8A is a schematic diagram illustrating individual structural layers 656, 657, 658 of a single filter channel 852 of dual channel polarization filter structure 450 for wireless communication systems 100, 400, and/or 500, in accordance with an embodiment of the present disclosure. In FIG. 8A, structural layers 656, 657, 658 of filter channel 852 are shown expanded to illustrate their individual arrays of rectangular patterned structures (e.g., rectangular patterned resistive/NiP strips 856 and rectangular patterned slots 857) used to form individual filter elements 652. In various embodiments, filter channel 852 may be implemented according to a passive PCB based polarization filter employing a metamaterial absorber arrangement to attenuate signals with polarizations outside a selected principal axis and to attenuate reflected signals generated within wireless communication linkages 140, 240, 340, and/or 440, as described herein. Such metamaterial absorber arrangement may include, for each filter element 652, a resistive/NiP rectangular strip separated from a rectangular slot in an otherwise planar metal background by a substrate (e.g., a substrate of structural layer 656 or 658) with a thickness approximately one quarter the wavelength associated with the operational band being filtered. In embodiments with three structural layers, as shown, each filter element 652 includes two such metamaterial absorber arrangements, a front arrangement (e.g., structural layer 656 and a front metal layer of PCB layer 657) and a back arrangement (e.g., structural layer 658 and a back metal layer of PCB layer 657), such that signals with vertical polarizations may pass through filter channel 852 substantially without attenuation or reflection, and signals with non-vertical polarizations, and in particular signals with orthogonal horizontal polarizations, are absorbed substantially without reflection.

As such, embodiments of filter channel 852 may be used to help prevent or eliminate reflected or direct crosstalk signals 326 and/or 327 within wireless communication linkages 140, 240, 340, and/or 440. In general, filter channel 852 may be approximately 1.5 mm thick, for example, and may act as an enclosure shell for host 110, client devices 130, and/or transceiver modules 120 and/or 124. As such, dual channel polarization filter structures 450 and 460, implemented with individual filter channels similar to filter channel 852, may be used to produce reliable wireless communication linkages that are substantially independent of system enclosure design, which helps increase reliable operable gap distances and/or data bandwidth rates across a wide range of wireless communication applications.

Figure 8B:
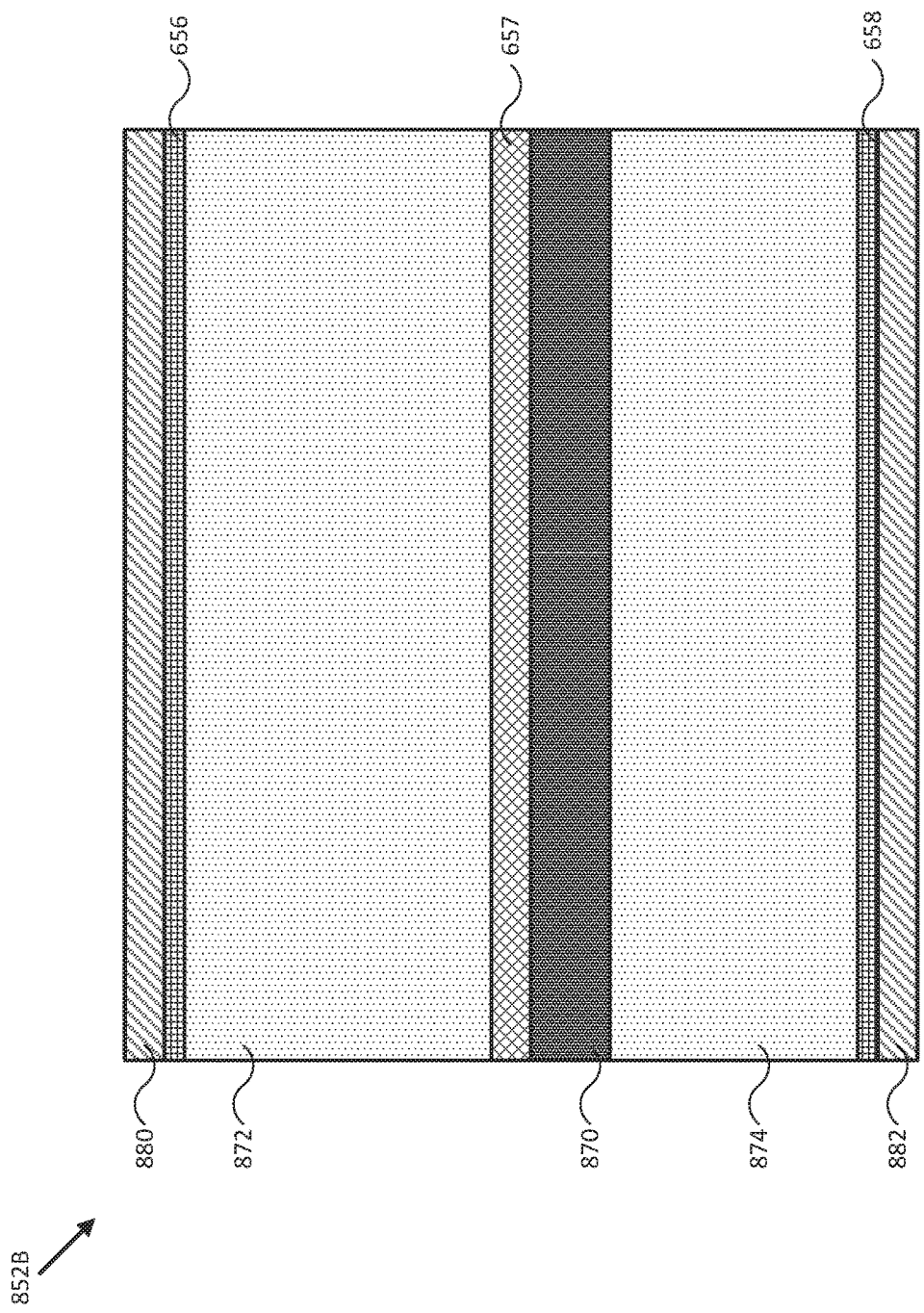
FIG. 8B is a schematic diagram illustrating a laminate assembly used to form a single filter channel of a dual channel polarization filter structure for a wireless communication system, in accordance with an embodiment of the present disclosure.

FIG. 8B is a schematic diagram (not drawn to scale) illustrating a laminate assembly 852B of individual structural layers 656, 657, 658 used to form single filter channel 852 of dual channel polarization filter structure 450 for wireless communication systems 100, 400, and/or 500, in accordance with an embodiment of the present disclosure. In FIG. 8A, structural layers 656, 657, 658 of laminate assembly 852B are shown adhered to each other to illustrate the general relative spacing and thicknesses individual structural and support layers used to form individual filter elements 652 (e.g., rectangular patterned resistive/NiP strips 856 and rectangular patterned slots 857). In various embodiments, laminate assembly 852B may be implemented according to a passive PCB based laminate assembly employing a metamaterial absorber arrangement to attenuate signals with polarizations outside a selected principal axis and to attenuate reflected signals generated within wireless communication linkages 140, 240, 340, and/or 440, as described herein. Such metamaterial absorber arrangement may include, for each filter element 652, a resistive/NiP rectangular strip formed in resistive/NiP layers 656 and 658 each separated from a rectangular slot in an otherwise planar metal layer 657 by a respective substrate 872 and 874 (e.g., a substrate of structural layer 656 or 658) and/or a structural support layer 870 by an aggregate thickness (e.g., vertical distance in FIG. 8B) approximately one quarter the wavelength associated with the operational band being filtered.

In embodiments with three structural layers, as shown, each filter element 652 may include two such metamaterial absorber arrangements, such that signals with vertical polarizations may pass through corresponding filter channel 852 substantially without attenuation or reflection, and signals with non-vertical polarizations, and in particular signals with orthogonal horizontal polarizations, are absorbed substantially without reflection. In such embodiments, the two metamaterial absorber arrangements may include a front arrangement implemented with structural/resistive layer 656 and a top portion/half of metal layer 657 and a back arrangement implemented with structural/resistive layer 658 and a bottom portion/half of metal layer 657, such that metal layer 657 is used to form both the front and back metamaterial absorber arrangements used to form each filter element 652. In alternative embodiments with four structural layers, a second metal layer similar to metal layer 657 may be formed adjoining the opposite side of structural support layer 870 between structural support layer 870 and substrate 874, and the thickness of substrate 874 increased, such that the front metamaterial absorber arrangement is implemented with resistive layer 656 and metal layer 657 and the back metamaterial absorber arrangement is implemented with resistive layer 658 and a second metal layer (e.g., similar in thickness and material to metal layer 657) disposed between structural support layer 870 and substrate 874.

In general, metal layer 657 may be deposited or laminated to structural support layer 870 and patterned or etched to form patterned slots 857, substrates 872 and 874 may be formed or laminated to the resulting structure, resistive layers 656 and 658 may be deposited or otherwise formed on substrates 872 and 874 and patterned to form resistive strips 856, as shown in FIGS. 8A-B. In some embodiments, laminate assembly 852B may include additional protective or solder mask layers 880 and 882 formed over resistive layers 656 and 658. In the embodiment shown in FIG. 8B, metal layer 657 may be implemented as a copper layer approximately 17.5 um thick, structural support layer 870 may be implemented as a Megtron and/or prepreg generally dielectric layer approximately 0.125 mm thick, substrate 872 may be implemented as a Megtron and/or core generally dielectric layer approximately 0.625 mm thick, substrate 874 may be implemented as a Megtron and/or core generally dielectric layer approximately 0.5 mm thick, structural/resistive layers 656 and 658 may each be implemented as a resistive NiP metal alloy film or layer approximately 0.2 um thick (e.g., approximately 50 Ohms/sqare), and, if present, solder mask layers 880 and 882 may be formed approximately 0.02 mm thick. In various embodiments, the resistance and thickness of the resistive layers are critical design parameters and should be tightly controlled. In particular, the distance between resistive layers 656, 658 and metal layer 657 may be adjusted to select a center frequency of the absorption band of the filter structure, and the dimensions of the resistive strips and slots formed in resistive layers 656, 658 and metal layer 657 may be adjusted to select the absorption depth of the filter structure.

Figure 9:
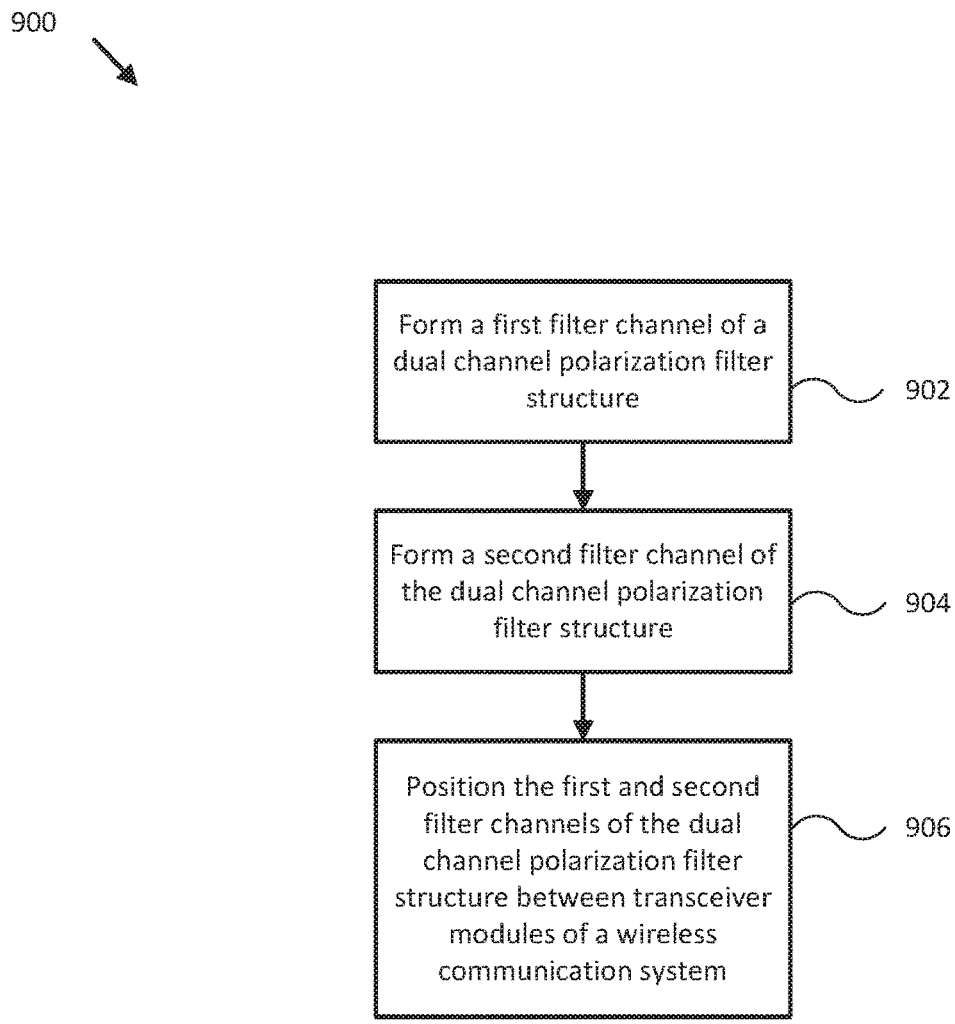
FIG. 9 illustrates a process for forming a dual channel polarization filter structure for a wireless communication system, in accordance with an embodiment of the disclosure.

FIG. 9 illustrates a process 900 for forming a dual channel polarization filter structure for wireless communication systems 100, 400, and/or 500, in accordance with an embodiment of the disclosure. In some embodiments, the operations of FIG. 9 may be implemented as software instructions executed by one or more logic devices associated with an integrated circuit and/or PCB patterning, fabrication, and/or assembly system. More generally, the operations of FIG. 9 may be implemented with any combination of software instructions and/or electronic hardware (e.g., inductors, capacitors, amplifiers, actuators, antennas, phase adjustors, amplifiers, other analog and/or digital components, deposition systems, etching or patterning systems, or other electronic or electrical fabrication systems). It should be appreciated that any step, sub-step, sub-process, or block of process 900 may be performed in an order or arrangement different from the embodiments illustrated by FIG. 9. For example, in other embodiments, one or more blocks may be omitted from process 900, and other blocks may be included. Furthermore, block inputs, block outputs, various sensor signals, sensor information, calibration parameters, and/or other operational parameters may be stored to one or more memories prior to moving to a following portion of process 900. Although process 900 is described with reference to systems 100, 400, and 500 and elements of FIGS. 1-8, process 900 may be performed with respect to other systems and including a different selection of electronic devices, sensors, assemblies, and/or antenna arrangements. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a first filter channel of a dual channel polarization filter structure is formed. For example, a controller for a fabrication system may be configured to use the fabrication system to etch, print, or otherwise pattern structural layer 656 to form an array of rectangular patterned resistive strips 856 on a front surface of structural layer 656 and/or substrate 872, pattern structural layer(s) 657 to form a corresponding array of rectangular patterned slots 857 on a front and/or back metalized surface of structural support layer/PCB 870, and pattern structural layer 658 to form a corresponding array of rectangular patterned resistive strips 856 on a back surface of structural layer 658 and/or substrate 874. The controller for the fabrication system may then use the fabrication system to assemble the structural layers into filter channel 452/852 by laminating or otherwise affixing a back surface of structural layer 656 and/or substrate 872 to a front surface of structural layer 657 such that each rectangular patterned resistive strip 856 is spatially aligned over a corresponding rectangular patterned slot 857 (e.g., center-to-center alignment), for example, and then laminating or otherwise affixing a front surface of structural layer 658 and/or substrate 874 to a back surface of structural layer 657 and/or structural support layer/PCB 870 such that each rectangular patterned resistive strip 856 is spatially aligned over a corresponding rectangular patterned slot 857, as described herein.

In block 904, a second filter channel of a dual channel polarization filter structure is formed. For example, the controller for the fabrication system used to form the first filter channel in block 902 may be configured to use the fabrication system to etch, print, or otherwise pattern structural layer 656 to form an array of rectangular patterned resistive strips 856 on a front surface of structural layer 656 and/or substrate 872, pattern structural layer(s) 657 to form a corresponding array of rectangular patterned slots 857 on a front and/or back metalized surface of structural support layer/PCB 870, and pattern structural layer 658 to form a corresponding array of rectangular patterned resistive strips 856 on a back surface of structural layer 658 and/or substrate 874. The controller for the fabrication system may then use the fabrication system to assemble the three structural layers into filter channel 454/852 by laminating or otherwise affixing a back surface of structural layer 656 and/or substrate 872 to a front surface of structural layer 657 such that each rectangular patterned resistive strip 856 is spatially aligned over a corresponding rectangular patterned slot 857 (e.g., center-to-center alignment), for example, and then laminating or otherwise affixing a front surface of structural layer 658 and/or substrate 874 to a back surface of structural layer 657 and/or structural support layer/PCB 870 such that each rectangular patterned resistive strip 856 is spatially aligned over a corresponding rectangular patterned slot 857, as described herein In block 906, first and second filter channels of a dual channel polarization filter structure are positioned. For example, the controller for the fabrication system used to form the first filter channel 452 in block 902 and/or the second filter channel 454 in block 904 may be configured to use the fabrication system to position second filter channel 454 edge adjacent to first filter channel 452, in a common plane, such that the individual filter elements 654 of second filter channel 454 are aligned orthogonally (e.g., 90 degrees rotated) relative to the individual filter elements 652 of first filter channel 452. The controller for the fabrication system may then use the fabrication system to adhere, glue, or otherwise affix first filter channel 452 to second filter channel 454 to form dual channel polarization filter structure 450, as described herein. Once formed, dual channel polarization filter structure 450 may be positioned between transceiver modules 120 and 124 of wireless communication systems 100, 400, and/or 500.

In some embodiments, blocks 902 and 904 may be combined such that vertical and horizontal rectangular patterned resistive strips 856 are formed within or on structural layers 656 and 658 at substantially the same time, and corresponding vertical and horizontal rectangular patterned slots 857 are formed at substantially the same time, and both first and second filter channels 452 and 454 and dual channel polarization filter structure 450 are formed substantially simultaneously by laminating the three structural layers together. In other embodiments, each filter channel 452 and 454 may be formed separately and be individually positioned between transceiver modules 120 and 124 of wireless communication systems 100, 400, and/or 500. Such positioning may include coupling and/or affixing first and second filter channels 452 and 454 and/or dual channel polarization filter structure 450 to transceiver modules 120 and/or 124. In some embodiments, such positioning may include forming at least a part of an enclosure for elements of system 100 using dual channel polarization filter structure 450.

Thus, by providing wireless communication systems including dual channel polarization filter structures, embodiments of the present disclosure provide relatively compact wireless communication systems that operate reliably across a range of wireless communication linkages, which results in increases in both operational gap distances for devices integrated with such wireless communication systems. Moreover, the increased operational gap distances and overall system reliability allows embodiments to form and maintain wireless communications networks and/or reliably detect objects according to higher sensor and/or other data rates than those achievable using conventional methodologies.

Figure 10:
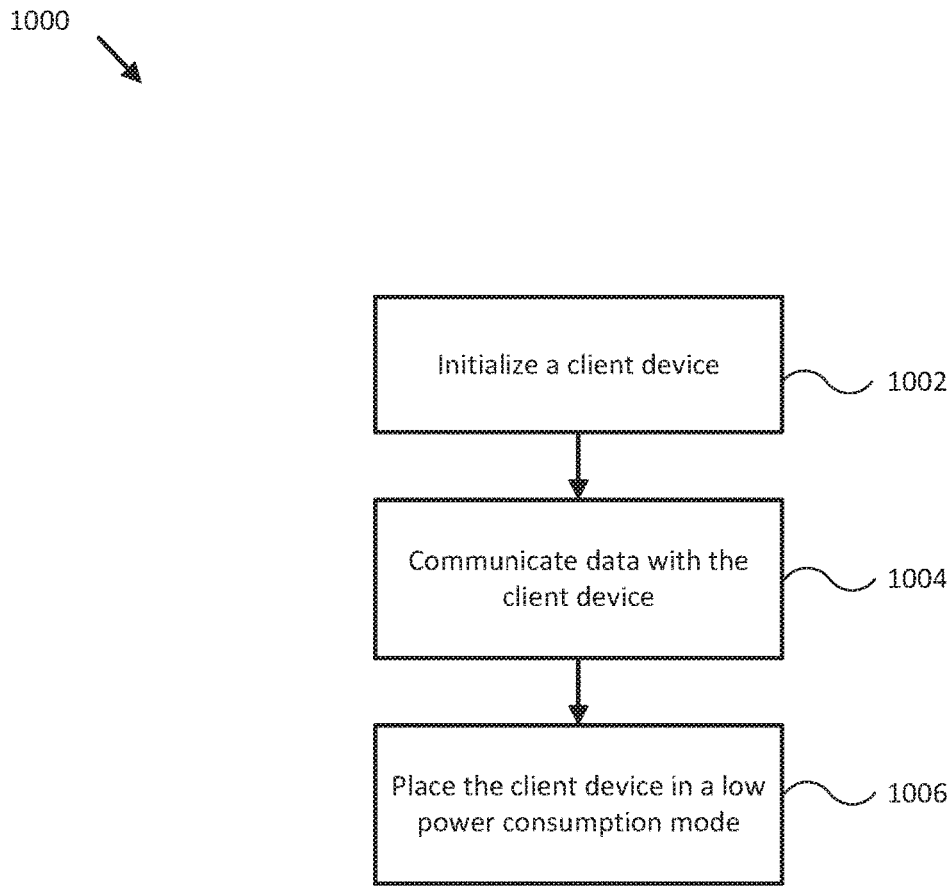
FIG. 10 illustrates a process to operate a client device using a wireless communication system incorporating one or more dual channel polarization filter structures in accordance with an embodiment of the disclosure.

FIG. 10 illustrates a process 1000 to operate a client device using wireless communication systems 100, 400, and/or 500 incorporating one or more dual channel polarization filter structures 450, 460 in accordance with an embodiment of the disclosure. In some embodiments, the operations of FIG. 10 may be implemented as software instructions executed by one or more logic devices associated with corresponding electronic devices, sensors, and/or structures depicted in FIGS. 1 through 8. More generally, the operations of FIG. 10 may be implemented with any combination of software instructions and/or electronic hardware (e.g., inductors, capacitors, amplifiers, actuators, or other analog and/or digital components). It should be appreciated that any step, sub-step, sub-process, or block of processes 1000 may be performed in an order or arrangement different from the embodiments illustrated by FIG. 10. For example, in other embodiments, one or more blocks may be omitted from process 1000, and other blocks may be included. Furthermore, block inputs, block outputs, various sensor signals, sensor information, calibration parameters, and/or other operational parameters may be stored to one or more memories prior to moving to a following portion of process 1000. Although process 1000 is described with reference to systems 100, 400, and 500, and other elements of FIGS. 1-8, process 1000 may be performed by other systems different from systems 100, 400, and 500 and including a different selection of electronic devices, sensors, assemblies, and/or transceiver module arrangements. At the initiation of process 1000, various system parameters may be populated by prior execution of a process similar to process 1000, for example, or may be initialized to zero and/or one or more values corresponding to typical, stored, and/or learned values derived from past operation of process 1000, as described herein.

In block 1002, a logic device initializes a client device. For example, host 110 of system 100 may be configured to initialize one or more of client devices 130 by communicating one or more control and or data signals over host buses 112 to transceiver module 120, across one or more filtered wireless communication links 422, 426 to transceiver module 124, and over client busses 132 to client controller 133, other devices 138, and/or other client devices 130. Such initialization may include placing one or more of client devices 130 in an active mode, such as awakening a device from a low power consumption, sleep, or deactivated mode. In some embodiments, host 110 of system 100 may be configured to initiate ranging sensing by a LIDAR system (e.g., client controller 133 and/or other devices 138) and/or other ranging sensor system by communicating one or more control and or data signals across one or more filtered wireless communication links 422, 426 to client controller 133, other devices 138, and/or other client devices 130. Because the linearly polarized wireless communication links 122 and 126 are filtered to produce filtered linearly polarized communication links 422 and 426 by dual channel polarization filter structures 450 and/or 460, such control and/or data signals may be communicated over wireless communication linkage 440 at relatively large gap distances 128.

In block 1004, a logic device communicates data with a client device. For example, host 110 of system 100 may be configured to provide video data to a display of client devices 130 for display to a user, to receive user interface data, such as from a mouse or camera of client devices 130, to allow a user to provide user feedback to system 100. In some embodiments, host 110 of system 100 may be configured to receive ranging data from a LIDAR system (e.g., client controller 133 and/or other devices 138) by receiving ranging sensor data communicated over client buses 132 to transceiver module 124, across one or more filtered wireless communication links 422, 426 to transceiver module 120, and over host busses 112. filtered to produce filtered linearly polarized communication links 422 and 426 by dual channel polarization filter structures 450 and/or 460, such ranging sensor data may be communicated over wireless communication linkage 440 at relatively large gap distances 128. Subsequent to receiving such data, host 110 may be configured to determine a position of an object (e.g., a range and/or direction to the object) detected by a LIDAR or other ranging sensor system (e.g., client controller 133 and/or other devices 138) based on ranging sensor data received in block 1004.

In block 1006, a logic device places a client device in a low power consumption mode. For example, host 110 of system 100 may be configured to place one or more of client devices 130 into such low power consumption mode by communicating one or more control and or data signals over host buses 112 to transceiver module 120, across one or more filtered wireless communication links 422, 426 to transceiver module 124, and over client busses 132 to client controller 133, other devices 138, and/or other client devices 130. Such control may include placing one or more of client devices 130 in a passive mode, such as placing a device into a low power consumption mode, a sleep mode, or deactivated mode (e.g., deactivating the device in a manner that allows the device to be reactivated over wireless communication linkage 440).

By employing the methods described herein, including combinations of different or alternative methods, embodiments of the present disclosure are able to reliably control and/or communicate relatively large bandwidths of data with one or more client devices 130 over wireless communication linkage 440. Devices including dual channel polarization filter structures, as described herein, are able to operate more reliably at higher bandwidth rates and larger gap distances and control characteristics or parameters of client devices according to shorter time periods/latencies.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A device comprising:
    a first transceiver module of a wireless communication system configured to faun one or more linearly polarized communication links with a second transceiver module of the wireless communication system; and
    a dual channel polarization filter structure positioned between the first and second transceiver modules and configured to filter the one or more linearly polarized communication links to produce corresponding one or more filtered linearly polarized communication links;
    wherein the dual channel polarization filter structure comprises first and second filter channels each formed from three structural layers including at least one metalized layer disposed between the remaining two structural layers, and wherein each filter channel comprises an array of filter elements each comprising at least one metamaterial absorber arrangement.

2. The device of claim 1, wherein each metamaterial absorber arrangement comprises:
    a rectangular patterned resistive strip formed in a top structural layer of the three structural layers; and
    a rectangular patterned slot formed in the at least one metalized layer, wherein the rectangular patterned resistive strip formed in the top structural layer is spatially aligned over the rectangular patterned slot and separated from the rectangular patterned slot by a substrate of the top structural layer.

3. The device of claim 1, wherein each metamaterial absorber arrangement comprises:
    a rectangular patterned resistive strip formed in a bottom structural layer of the three structural layers; and
    a rectangular patterned slot formed in the at least one metalized layer, wherein the rectangular patterned resistive strip formed in the bottom structural layer is spatially aligned over the rectangular patterned slot and separated from the rectangular patterned slot by a substrate of the bottom structural layer.

4. The device of claim 1, wherein:
    the first filter channel of the dual channel polarization filter is aligned orthogonally relative to the second filter channel of the dual channel polarization filter.

5. The device of claim 1, wherein:
    the first filter channel of the dual channel polarization filter is coupled and/or affixed to the first or second transceiver module.

6. The device of claim 1, wherein the dual channel polarization filter structure comprises a first dual channel polarization filter structure, the device further comprising:
    a second dual channel polarization filter structure positioned between the second transceiver module and the first dual channel polarization filter structure and configured to filter the one or more linearly polarized communication links and/or the one or more filtered linearly polarized communication links produced by the first dual channel polarization filter.

7. A method of operating a client device coupled to the second transceiver module using the device of claim 1, the method comprising:
    initializing the client device by communicating one or more control and/or data signals over the one or more filtered linearly polarized wireless communication links produced by the dual channel polarization filter structure;

communicating data with the client device by communicating the data over the one or more filtered linearly polarized wireless communication links produced by the dual channel polarization filter structure; and placing the client device in a low power consumption mode.

8. A method for forming the device of claim 1, comprising:

forming the first filter channel of the dual channel polarization filter structure;

forming the second filter channel of the dual channel polarization filter structure; and positioning the first and second filter channels of the dual channel polarization filter structure between the first and second transceiver modules.

9. The method of claim 8, wherein the forming the first filter channel comprises:

patterning a top structural layer of the first filter channel to form a first array of rectangular patterned resistive strips on a front surface of the top structural layer;

patterning a middle structural layer of the first filter channel to form an array of rectangular patterned slots in the at least one metalized layer of the middle structural layer;

patterning a bottom structural layer of the first filter channel to form a second array of rectangular patterned resistive strips on a back surface of the bottom structural layer, wherein the bottom structural layer is patterned to form a mirror image of the patterned top structural layer; and adhering a back surface of the top structural layer to a front surface of the middle structural layer, and a front surface of the bottom structural layer to a back surface of the middle structural layer, to form the first filter channel.

10. A wireless communication system, comprising:

a first transceiver module configured to form one or more linearly polarized communication links with a second transceiver module;

a host coupled to the first transceiver module and configured to control operation of a client device coupled to the second transceiver module over the one or more linearly polarized communication links;

a dual channel polarization filter structure positioned between the first and second transceiver modules and configured to filter the one or more linearly polarized communication links to produce corresponding one or more filtered linearly polarized communication links; and a memory configured to store a plurality of computer readable instructions which when executed by the host and/or a client controller are adapted to cause the wireless communication system to perform a method comprising:

initializing the client device by communicating one or more control and/or data signals over the one or more filtered linearly polarized wireless communication links produced by the dual channel polarization filter structure;

communicating data with the client device by communicating the data over the one or more filtered linearly polarized wireless communication links produced by the dual channel polarization filter structure; and placing the client device in a low power consumption mode.

11. The system of claim 10, wherein the dual channel polarization filter structure comprises a filter channel formed from three structural layers including at least one metalized layer disposed between the remaining two structural layers, the filter channel comprises an array of filter elements each comprising at least one metamaterial absorber arrangement, and each metamaterial absorber arrangement comprises:

a rectangular patterned resistive strip formed in a top structural layer of the three structural layers; and a rectangular patterned slot formed in the at least one metalized layer, wherein the rectangular patterned resistive strip formed in the top structural layer is spatially aligned over the rectangular patterned slot and separated from the rectangular patterned slot by a substrate of the top structural layer.

12. The system of claim 10, wherein the dual channel polarization filter structure comprises at least one metamaterial absorber arrangement, and wherein each metamaterial absorber arrangement comprises:

a rectangular patterned resistive strip formed in a bottom structural layer of the three structural layers; and a rectangular patterned slot formed in the at least one metalized layer, wherein the rectangular patterned resistive strip formed in the bottom structural layer is spatially aligned over the rectangular patterned slot and separated from the rectangular patterned slot by a substrate of the bottom structural layer.

13. The system of claim 10, wherein:

a first filter channel of the dual channel polarization filter is aligned orthogonally relative to a second filter channel of the dual channel polarization filter.

14. The system of claim 10, wherein:

a first filter channel of the dual channel polarization filter is coupled and/or affixed to the first or second transceiver module.

15. The system of claim 10, wherein the dual channel polarization filter structure comprises a first dual channel polarization filter structure, the device further comprising:

a second dual channel polarization filter structure positioned between the second transceiver module and the first dual channel polarization filter structure and configured to filter the one or more linearly polarized communication links and/or the one or more filtered linearly polarized communication links produced by the first dual channel polarization filter.

16. A method for forming a dual channel polarization filter structure for a wireless communication system, the method comprising:

forming a first filter channel of the dual channel polarization filter structure; and forming the second filter channel of the dual channel polarization filter structure;

wherein the first and second filter channels are each formed from three structural layers including at least one metalized layer disposed between the remaining two structural layers, and wherein each filter channel comprises an array of filter elements each comprising at least one metamaterial absorber arrangement.

17. The method of claim 16, wherein the forming the first filter channel comprises:

patterning a top structural layer of the first filter channel to form a first array of rectangular patterned resistive strips on a front surface of the top structural layer;

patterning a middle structural layer of the first filter channel to form an array of rectangular patterned slots in the at least one metalized layer of the middle structural layer;

patterning a bottom structural layer of the first filter channel to form a second array of rectangular patterned resistive strips on a back surface of the bottom structural layer, wherein the bottom structural layer is patterned to form a mirror image of the patterned top structural layer; and adhering a back surface of the top structural layer to a front surface of the middle structural layer, and a front surface of the bottom structural layer to a back surface of the middle structural layer, to form the first filter channel.

18. The method of claim 16, wherein each metamaterial absorber arrangement comprises:
a rectangular patterned resistive strip formed in a top structural layer of the three structural layers; and
a rectangular patterned slot formed in the at least one metalized layer, wherein the rectangular patterned resistive strip formed in the top structural layer is spatially aligned over the rectangular patterned slot and separated from the rectangular patterned slot by a substrate of the top structural layer.

19. The method of claim 16, wherein each metamaterial absorber arrangement comprises:
a rectangular patterned resistive strip formed in a bottom structural layer of the three structural layers; and
a rectangular patterned slot formed in the at least one metalized layer, wherein the rectangular patterned resistive strip formed in the bottom structural layer is spatially aligned over the rectangular patterned slot and separated from the rectangular patterned slot by a substrate of the bottom structural layer.

20. The method of claim 16, wherein:
the first filter channel of the dual channel polarization filter is aligned orthogonally relative to the second filter channel of the dual channel polarization filter.

* * * * *

UNITED STATES PATENT AND TRADEMARK OFFICE
CERTIFICATE OF CORRECTION

| | | |
|---|---|---|
| PATENT NO. | : 10,484,117 B1 | Page 1 of 1 |
| APPLICATION NO. | : 16/103720 | |
| DATED | : November 19, 2019 | |
| INVENTOR(S) | : Rongrong Lu and Ron Zeng | |

It is certified that error appears in the above-identified patent and that said Letters Patent is hereby corrected as shown below:

In the Specification

In the Detailed Description:

In Column 9, Line 54, change "sqare" to --square--

In the Claims

In Column 14, Line 7, change "faun" to --form--

Signed and Sealed this
Fifth Day of January, 2021

Andrei Iancu
*Director of the United States Patent and Trademark Office*